United States Patent
Sloan

(10) Patent No.: US 11,392,656 B2
(45) Date of Patent: *Jul. 19, 2022

(54) INCENTIVIZED ELECTRONIC PLATFORM

(71) Applicant: Fan Label, LLC, Birmingham, MI (US)

(72) Inventor: Jeffrey M. Sloan, Birmingham, MI (US)

(73) Assignee: Fan Label, LLC, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,060

(22) Filed: Apr. 12, 2021

(65) Prior Publication Data

US 2021/0232651 A1    Jul. 29, 2021

Related U.S. Application Data

(63) Continuation of application No. 15/637,844, filed on Jun. 29, 2017, now Pat. No. 11,023,543.

(51) Int. Cl.
*G06F 16/9535* (2019.01)
*G06F 16/61* (2019.01)
*G06F 16/638* (2019.01)
*G06F 16/9537* (2019.01)
*G06F 16/9536* (2019.01)

(52) U.S. Cl.
CPC .......... *G06F 16/9535* (2019.01); *G06F 16/61* (2019.01); *G06F 16/638* (2019.01); *G06F 16/9536* (2019.01); *G06F 16/9537* (2019.01)

(58) Field of Classification Search
CPC .. G06F 16/9535; G06F 16/637; G06F 16/639; G06F 16/24578; G06F 16/24575; G06F 16/904; G06F 3/0482; G06F 3/0481; G06F 16/34; G06F 16/4387; G06F 17/5009; G06F 16/29

See application file for complete search history.

(56) References Cited

U.S. PATENT DOCUMENTS

| | | | |
|---|---|---|---|
| 7,921,440 B1 | 4/2011 | Kolde et al. | |
| 8,095,424 B2* | 1/2012 | Eglen | G06Q 30/00 705/26.1 |
| 8,380,710 B1 | 2/2013 | Finne et al. | |
| 8,678,930 B2 | 3/2014 | Gabrail et al. | |
| 8,756,224 B2 | 6/2014 | Dassa et al. | |

(Continued)

OTHER PUBLICATIONS

Larimer, Daniel et al., Steem, An Incentivized, Blockchain-based Social Media Platform, 2012, 44 pages.

(Continued)

*Primary Examiner* — Angelica Ruiz
(74) *Attorney, Agent, or Firm* — Brooks Kushman P.C.

(57) ABSTRACT

An incentivized electronic platform includes machine instructions when executed by the CPU that transmits a splash screen for displaying a contest to a mobile device, transmits a selection screen displaying a number of selections prompts corresponding to a digital register of songs, albums, and/or artists, receives a plurality of selections from the selection screen to form a digital record label, and calculates and transmits a score for the digital record label based on points assigned by an activity tracking algorithm and activity tracking parameters to a user.

23 Claims, 15 Drawing Sheets

(56) References Cited

U.S. PATENT DOCUMENTS

| | | |
|---|---|---|
| 9,162,107 B2 | 10/2015 | Aminzade |
| 2006/0008256 A1 | 1/2006 | Khedour et al. |
| 2008/0032723 A1 | 2/2008 | Rosenberg |
| 2008/0215420 A1 | 9/2008 | Angelica |
| 2009/0063511 A1 | 3/2009 | Myers et al. |
| 2009/0070331 A1 | 3/2009 | Silman |
| 2009/0277322 A1 | 11/2009 | Cai et al. |
| 2009/0288118 A1 | 11/2009 | Chang |
| 2010/0169204 A1 | 7/2010 | Sippy et al. |
| 2011/0055223 A1* | 3/2011 | Elmore ............. G07F 17/326 707/748 |
| 2011/0225121 A1* | 9/2011 | Cooper ............. G06F 16/273 707/634 |
| 2012/0011129 A1 | 1/2012 | van Zwol et al. |
| 2013/0073400 A1 | 3/2013 | Heath |
| 2013/0073473 A1 | 3/2013 | Heath |
| 2013/0191399 A1 | 7/2013 | Tocaben et al. |
| 2013/0218862 A1 | 8/2013 | Ghosh et al. |
| 2013/0117063 A1 | 10/2013 | Nugent et al. |
| 2014/0136554 A1 | 5/2014 | Moradi et al. |
| 2014/0162741 A1 | 6/2014 | Diskin et al. |
| 2014/0278986 A1 | 9/2014 | Rouse et al. |
| 2016/0117063 A1 | 4/2016 | Fuller |
| 2016/0149956 A1 | 5/2016 | Birnbaum et al. |
| 2018/0018712 A1 | 1/2018 | Walden et al. |

OTHER PUBLICATIONS

Pfeiffer, Joseph, III et al., Incentivized Sharing in Social Networks, VLDB Workshop on Online Social Systems (WOSS), 2012, 6 pages.

McNew, Sarah, Incentivize Your Fans: A New Approach To Social Media Fans, http://MY.SOCIAL TOASTER. COM, Jun. 11, 2014, 3 pages.

https://fandistro.com/releasing/, A FanDistro Campaign Will Get Your Video Shared More, Apr. 5, 2017, 4 pages.

www/http://My.SocialToaster.com, How It Works, Learn How to Turn Your Fans into Superfans, 2017, 3 pages.

* cited by examiner

INCENTIVIZED ELECTRONIC PLATFORM

CROSS-REFERENCE TO RELATED APPLICATION

This application is a continuation of U.S. application Ser. No. 15/637,844 filed Jun. 29, 2017 and issued on Jun. 1, 2021 as U.S. Pat. No. 11,023,543, the disclosure of which is incorporated herein by reference in its entirety.

TECHNICAL FIELD

This disclosure relates to an incentivized electronic platform.

BACKGROUND

Games may be used to improve socialization and activity among groups or associations. As groups and association sizes grow, technical solutions may be used to orchestrate gameplay and tally scores. Large-scale games may cause technical failures in game regulation infrastructure or impose large overhead costs. Technical improvements to game regulation and point systems may reduce such costs and processing requirements. Additionally, the use of these games on mobile devices may further restrict the processing power available to facilitate the games.

SUMMARY

In one embodiment, a data structured is embodied on a computer-readable medium having a database schema for accessing and managing incentivized electronic platform data in a structured query language (SQL) database is disclosed. The data schema includes a contest schema and an application. The contest schema including a plurality of contest and relational tables. Each contest includes a plurality of user selections with each user selection including a plurality of songs and/or artists. Each user selection and the plurality of songs and/or artists corresponding to a player. The relational tables being configured to track a plurality of songs and/or artists in each user selection to determine a score for each player. The score being based on one or more activity tracking parameters. The application being configured to access and manage the plurality of selected songs and/or artists, the one or more activity tracking parameters, and the scores for each player in the SQL database.

In another embodiment, an incentivized electronic platform including a computer having a memory for storing machine instructions and a central processing unit (CPU) for executing those machine instructions is disclosed. The machine instructions configured to transmit a splash screen to a mobile device, a selection screen to a mobile device, receive a plurality of selections from the selection screen and transmit a score to the mobile device. The splash screen displaying a contest. The splash screen displaying a contest and the selection screen displaying a number of selection prompts corresponding to a digital register. Each selection prompt representing a song, album, and/or artist. The plurality of selections forming a digital label (e.g., a music or record label). The score being based on points assigned by an activity tracking algorithm and one or more activity tracking parameters.

In yet another embodiment, a computer system including a processor and a computer is disclosed. The computer having a memory for storing machine instructions and a central processing unit (CPU) for executing the machine instructions. The machine instructions, when implemented, transmitting a digital register of albums, songs, and/or artists to a plurality of user transceivers, receiving a collection of albums, songs, and/or artist from each user transceiver, calculating a score for each of the collections, and transmitting one or more scores to each of the plurality of user transceivers. The collection of albums, songs, and/or artist being selected from the digital register of albums, songs and/or artists. The score being based on activity tracking data for the albums, songs and/or artists in the collection.

In another embodiment, an incentivized electronic platform including a processor including a computer is disclosed. The computer including a memory for storing machine instructions and a central processing unit (CPU) for executing machine instructions. The machine instructions configured to generate a contest and one or more digital registers for the contest, transmit the one or more digital registers to a plurality of user transceivers, receive a plurality of digital record labels, initiate an activity tracking algorithm, and display a score at a user transceiver. The contest occurring over a duration of time having a start time and an expiration. The digital registers including albums, songs, and/or artists. Each digital record label corresponding to a respective one of the plurality of user transceivers and including a plurality of albums, songs, and/or artists selected from the digital registers on the respective one of the plurality of user transceivers. The activity tracking algorithm assigns points to each of the digital record labels and the score is based on the points.

DETAILED DESCRIPTION

Figure 1:
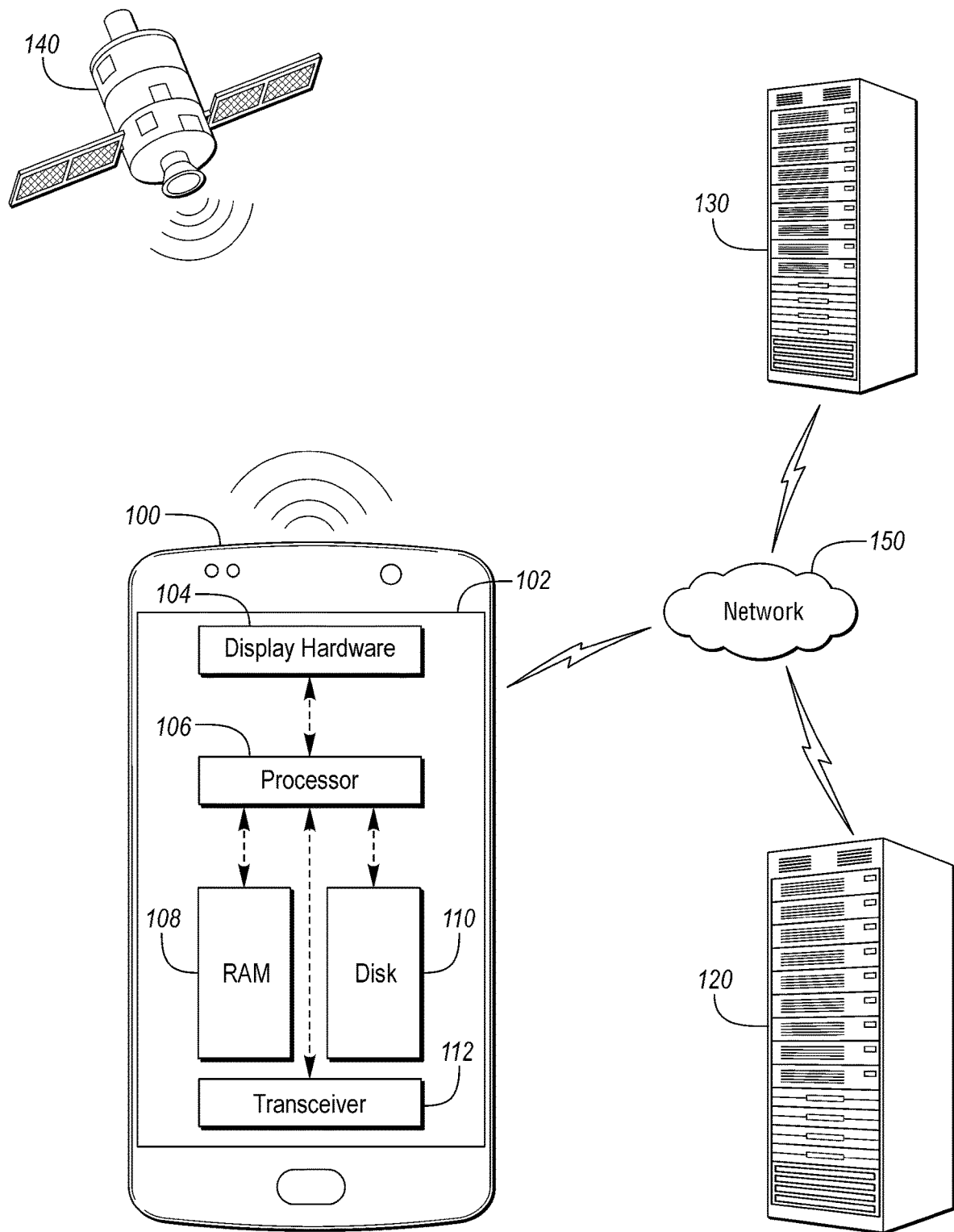
FIG. 1 is a computer system for improving the organization and point retention for an electronic game.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Processing and memory constraints necessitate efficient gaming platforms, architectures, and data schemas to allow interoperability with mobile devices. The existing computer game systems and point accumulators do not provide adequate technical solutions that provide efficient gaming platforms, architectures and data schemas. Mobile devices may have limited processing capabilities, memory availability, and data transmission capabilities. Movement from high-performance gaming rigs to mobile devices has increased the gravity of deficient data structures and communication methods.

The following proposed gaming systems have failed to provide adequate technical solutions to these acute problems.

U.S. Pat. No. 8,678,930, to Gabrail, discloses a fantasy league management system including one or more reality factors, equity lines, luxury taxes, or revenue sharing policies. The fantasy league management system discloses generic databases for storing and maintaining data. Gabrail, however, does not attempt to technically improve the association of data within the system or improve data structures and components necessary for fantasy league management. Gabrail attempts to apply computer methods to a well-known fantasy league practice, instead of a technical improvement to computers processing fantasy league parameters.

U.S. Pub. No. 2013/0191399A1, to Tacoben, discloses an inadequate content distribution system. The Tacoben system and method provides a generic "rotational database" structure. The Tacoben system does not provide technical improvement data structures to reduce processing, transmission, and memory usage of mobile devices and backend servers. Tacoben does not provide an improvement to computer functionality itself such as improving data structures required to maintain and process digital content.

U.S. Pub. No 2014/0162741A1, to Diskin, discloses a non-technical improvement to a fantasy league system for allocating points to a fantasy team. Diskin fails to address technical aspects necessary to improve the digital computer system. The fantasy league system of Diskin does not address specific data structures necessary to meet mobile device constraints.

On the other hand, the incentivized electronic platform, the computer system, the computer-readable medium, and the database signature components and parts described herein provide a non-abstract, technological improvement over the previous methods. These technological improvements are rooted in an incentivized data structure having a digital user ranking schema, and an incentivized results schema. The digital user ranking schema and the incentivized results schema are used by an incentivized electronic platform approach to access and manage provided digital content items in a SQL database.

According to one embodiment, a data structure embodied on a computer-readable medium may include a database schema for accessing and managing incentivized electronic platform data. Data stored in the schema may include digital content items or referential information to the digital content items. Each of the digital content items may be identified by a unique identifier. The unique identifier may be assigned to each digital content item using a hash mechanism (e.g., MD5). The unique identifier may also include a first portion to identify an original work and a second portion to identify a derivative work. The unique identifier may be used to organize the schema.

The schema may also include ranking information. The ranking information may be used to generate digital registers, including a subset of digital content items based on popularity or association. The schema is an innovative logical model for maintaining game data and information. An additional digital register may include a subset of unranked digital content items. The schema may include a column or identifier for recognizing unranked digital content items (e.g., null).

The ranked and unranked digital registers may be sent to a user through a network (e.g., internet) for selection such that the user can participate in a game. The user may select from the digital registers to form a digital user ranking. The digital user ranking may include digital content items from both registers. After the digital user ranking is determined, it is compared against other digital user rankings. The comparison uses activity tracking parameters to determine points associated with each digital user ranking. For example, an activity tracking parameter may be the popularity of the digital content item. If the digital content item is a song, points may be assigned to the digital user ranking based on the improvement of the song along the charts.

Referring to FIG. 1, a mobile device 100 is shown. The mobile device 100 may include a display 102. The display 102 may be an LCD, OLED or another implement. The display 102 may be driven by display hardware 104, which may include processors or drivers for illuminating the display 102. The display hardware 104 may be connected to a processor or processors 106. The processors 106 are associated with memory 108 and storage 110. The mobile device 100 may also include a transceiver 112 connected to the processor 106 for sending and receiving digital register data, digital user rankings, game information, game scores, and other information required by the game. For example, the game may have a location or region component to localize players such that players compete against similarly situated contestants. The localization component may use GPS 140 or cellular towers to locate and track the mobile device 100 over time. The device 100 may be associated with other nearby devices to form competitive groups. The players may be otherwise associated. For example, the players may be associated by school, fraternity, or sports teams.

The mobile device 100 may be configured to transmit and receive data through the internet 150. The internet 150 may be reached through cellular towers, satellite or ad-hoc networks. The mobile device 100 may be connected with a backend server 120. The backend server 120 may serve as the main repository for data and information associated with the game. The backend server 120 may include a data store and processing components to store digital content items and references, calculate scores associated with digital user rankings, track activity parameters to determine the score, and otherwise facilitate the game. The backend server 120 and mobile device 100 may be connected with a third-party fingerprinting server 130. The third-party fingerprinting server 130 may determine the unique identifiers associated with original digital content items and derivative digital content items. It should be appreciated that any combination of servers 120, 130 and mobile devices 100 may facilitate the game. For example, the game may be operated entirely on one device 100.

Figure 2:
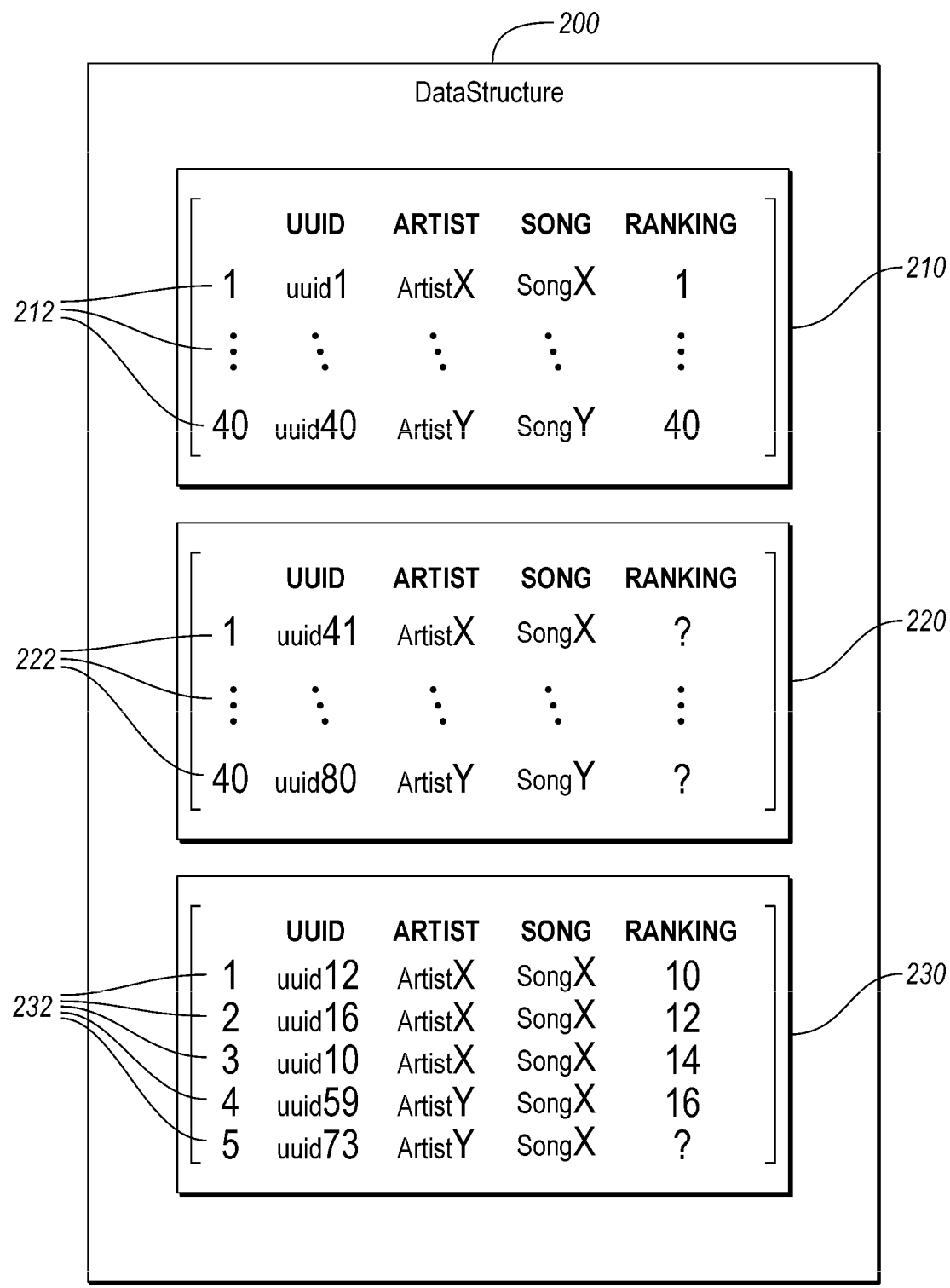
FIG. 2 is a data schema for storing a first or second digital register and a digital user ranking.

Referring to FIG. 2, a portion of a data structure 200 is shown. The data structure includes an efficient storage mechanism for storing digital user rankings 230 and digital registers 210, 220 of digital content items 212, 222, 232. The digital content items 212, 222 may be assigned to rows each having a unique identifier and other digital content item 212, 222 information. The ranked digital register 210 may include a variety of ranked digital content items 212 taken from a digital content repository. The repository may be located on the third-party fingerprinting service server 130. The digital content repository may be located on the data store of the backend server 120. The ranked digital register 210 may look like schema 1, below.

$$\begin{bmatrix} & UUID & ARTIST & SONG & RANKING \\ 1 & uuid1 & ArtistX & SongX & 1 \\ \vdots & \ddots & \ddots & \ddots & \vdots \\ 40 & uuid40 & ArtistY & SongY & 40 \end{bmatrix} \quad (1)$$

In order to sort the ranked digital register 210, the items may be bucket sorted, bubble sorted, insertion sorted, selection sorted, heap sorted, or most preferably merge sorted. The digital content items 212 may be arranged for selection by the user of the mobile device 100. The digital content items 212 may be arranged in the digital register 210 in a variety of ways. The digital content items 212 may be ranked according to popularity. The popularity index may be localized to the region or association of the user of the mobile device 100. For example, the ranked digital register 210 may be formed based on the local popularity of the digital content item 212. The digital content item 212 may be a song, book, movie, streamed media, music video, or other created content available in a digital form. The ranking may also take into consideration hardcopy or paper forms of the digital content items. The popularity index may incorporate or consist of a public popularity index (e.g., Nielsen®).

The data structure 200 may include an unranked digital register 220. The unranked digital register 220 may include unranked digital content items 222. The unranked digital content items may be selected from a variety of sources. The unranked digital content item 222 may be associated with the user of the mobile device 100. The unranked digital content item 222 may be promoted by a local radio station or part of an association related to the user of the mobile device 100. The unranked digital register 220 may be similar to schema 2, as shown below. As shown, the unranked digital content items 220 have different unique identifiers (UUIDs) than the ranked digital content items. The digital content items 212, 222 of the ranked and unranked digital registers 210, 220 may have little or no intersection.

$$\begin{bmatrix} & UUID & ARTIST & SONG & RANKING \\ 1 & uuid41 & ArtistX & SongX & ? \\ \vdots & \ddots & \ddots & \ddots & \vdots \\ 40 & uuid80 & ArtistY & SongY & ? \end{bmatrix} \quad (2)$$

The data structure 200 may include a digital user ranking 230 including selected digital content items 232. The selected digital content items 232 may be selected from at least one of the ranked and unranked digital registers 210, 220. The selected digital content items 232 may be tracked to determine the top score of the players in the game. The digital user ranking 230 or a portion thereof may be sent to the backend server 120. For example, the UUIDs associated with the selected digital content items 232 may be sent to the backend server. In another embodiment, activity tracking data associated with selected digital content items 232 may be sent to the mobile device 100 for tabulation thereby reducing the processing and memory required to obtain a score. The digital user ranking may be similar to schema 3, as shown below. Portions of the data structure 200 may be located on the backend server 120, mobile device 100, or third-party server 130.

$$\begin{bmatrix} & UUID & ARTIST & SONG & RANKING \\ 1 & uuid12 & ArtistX & SongX & 10 \\ 2 & uuid16 & ArtistX & SongY & 12 \\ 3 & uuid10 & ArtistX & SongZ & 14 \\ 4 & uuid59 & ArtistY & SongX & 16 \\ 5 & uuid73 & ArtistY & SongY & ? \end{bmatrix} \quad (3)$$

The data structure 200 may further include an activity tracking schema to track activity associated with each digital content item UUID. The activity tracking schema may include competition starting date ranking and accumulators for each of the activity tracking genres and each of the digital user rankings 230. For example, the activity tracking schema may include a column for tracking the promotions a user has made for each selected digital content item 232 on the digital user ranking 230.

The data structure 200 may further include demographic tracking information related to the user, contest, association, digital content creator, digital content items, or other information of interest. The data structure 200 may track what associations are promoting a digital content item or determine song preferences of a user.

Figure 3:
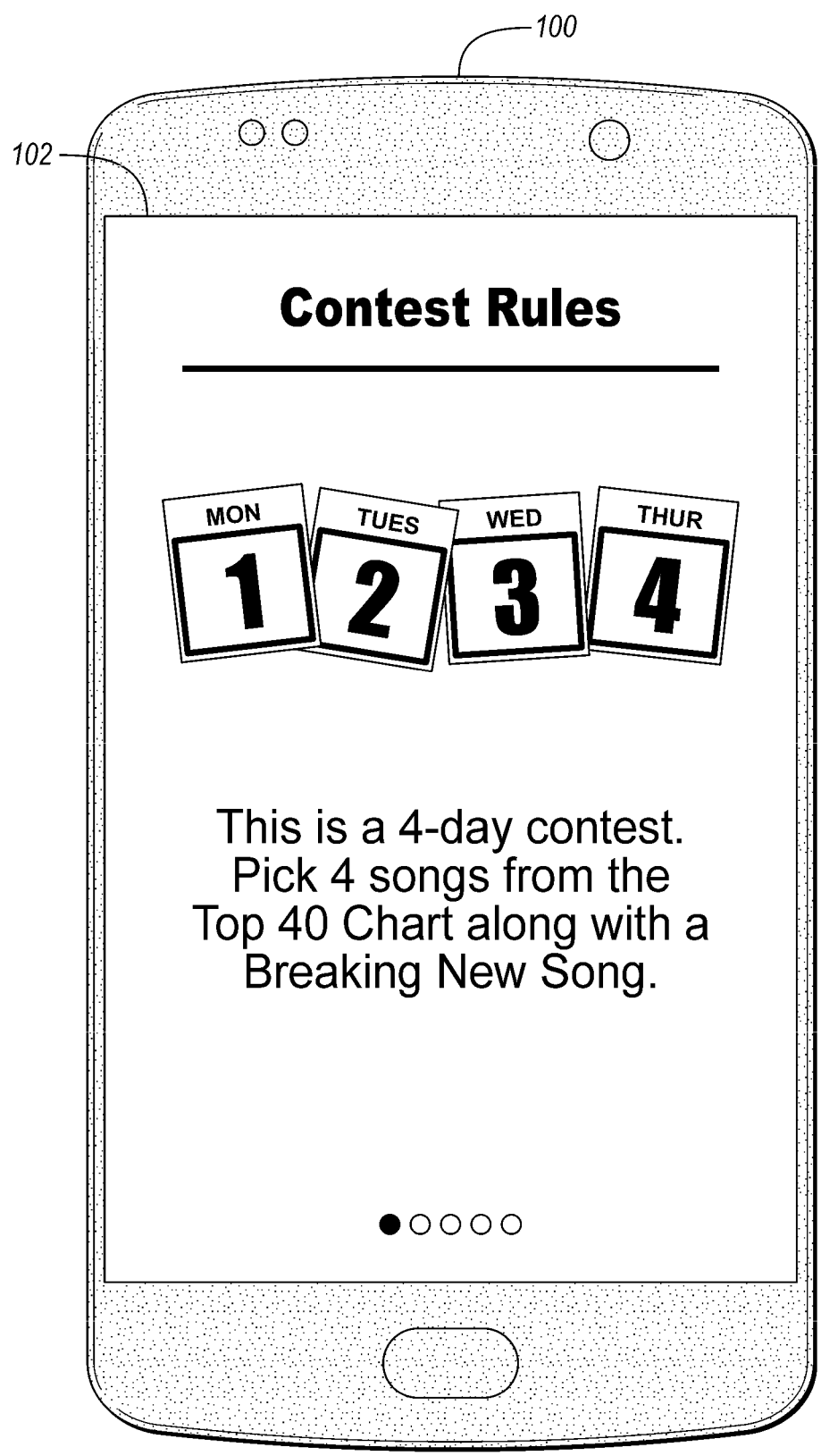
FIG. 3 is a computer graphical user interface (GUI) for a game having a four-day contest.

Referring to FIG. 3, a computer graphical user-interface (GUI) for the game is shown. The splash screen is displayed on the GUI 102 of the mobile device 100. The splash screen may define the game to be played. The game to be played may be a four-day contest organized by a radio station. The contest may include a selection of four ranked digital content items 212 from the ranked digital content register 210 and one unranked digital content item 222 from the unranked digital content register 220. The contest may be any length of time or be based on other factors (e.g., point total accumulation). The contest may vary by location and contest.

Figure 4:
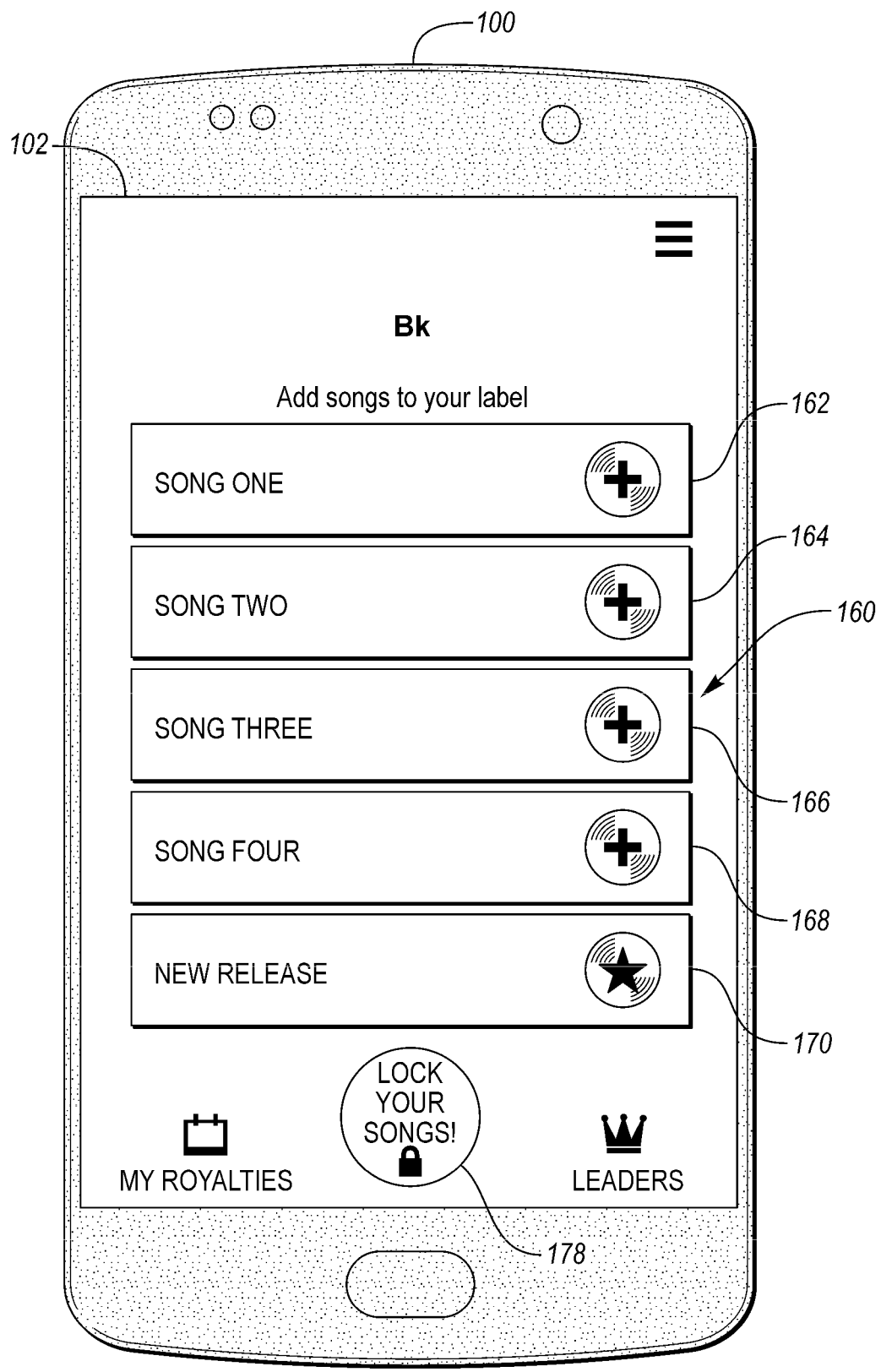
FIG. 4 is a GUI including a selection screen for a digital user ranking of a digital register.
Figure 5:
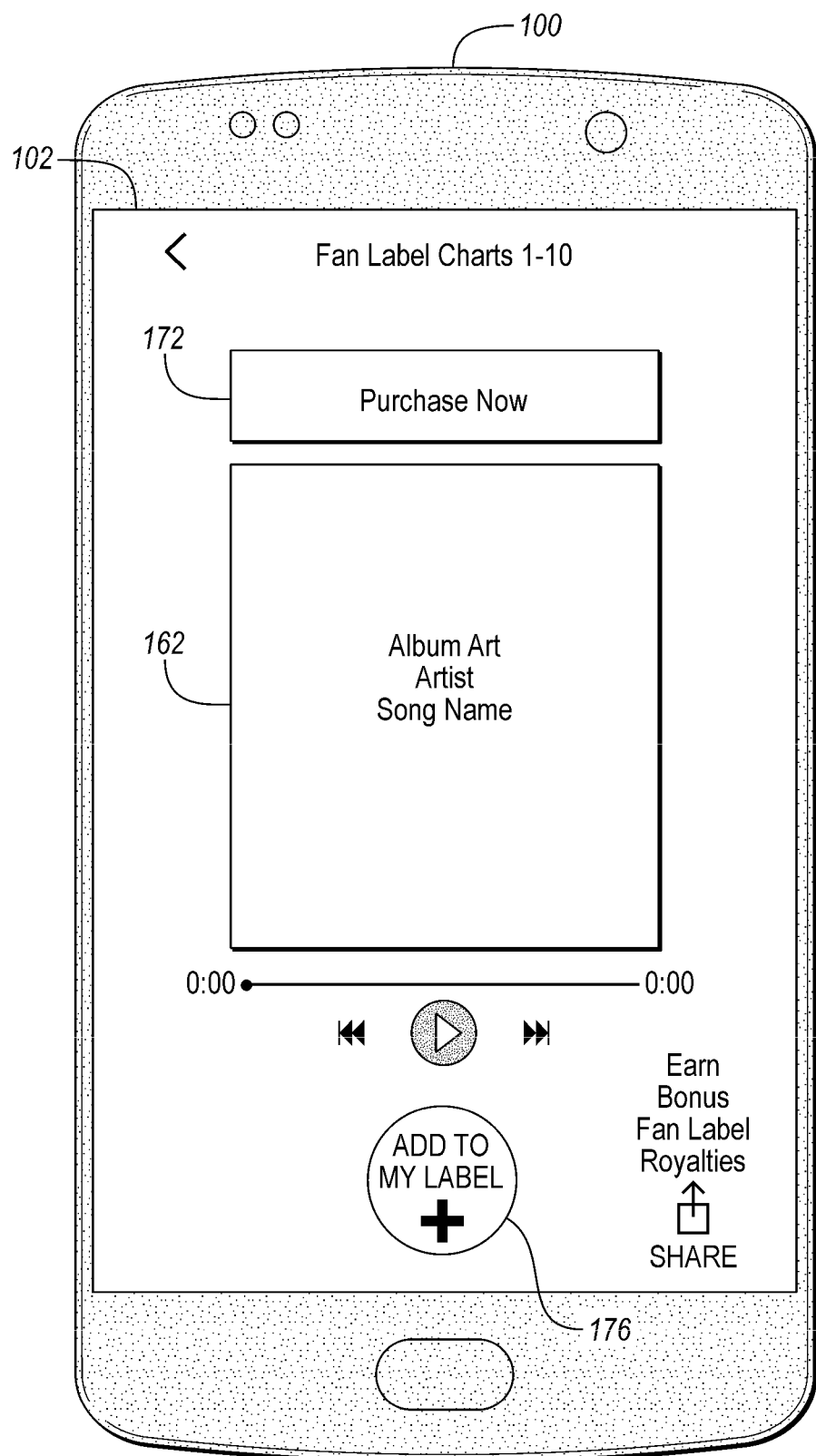
FIG. 5 is a GUI including a selection screen of a digital content item from a digital register.
Figure 6:
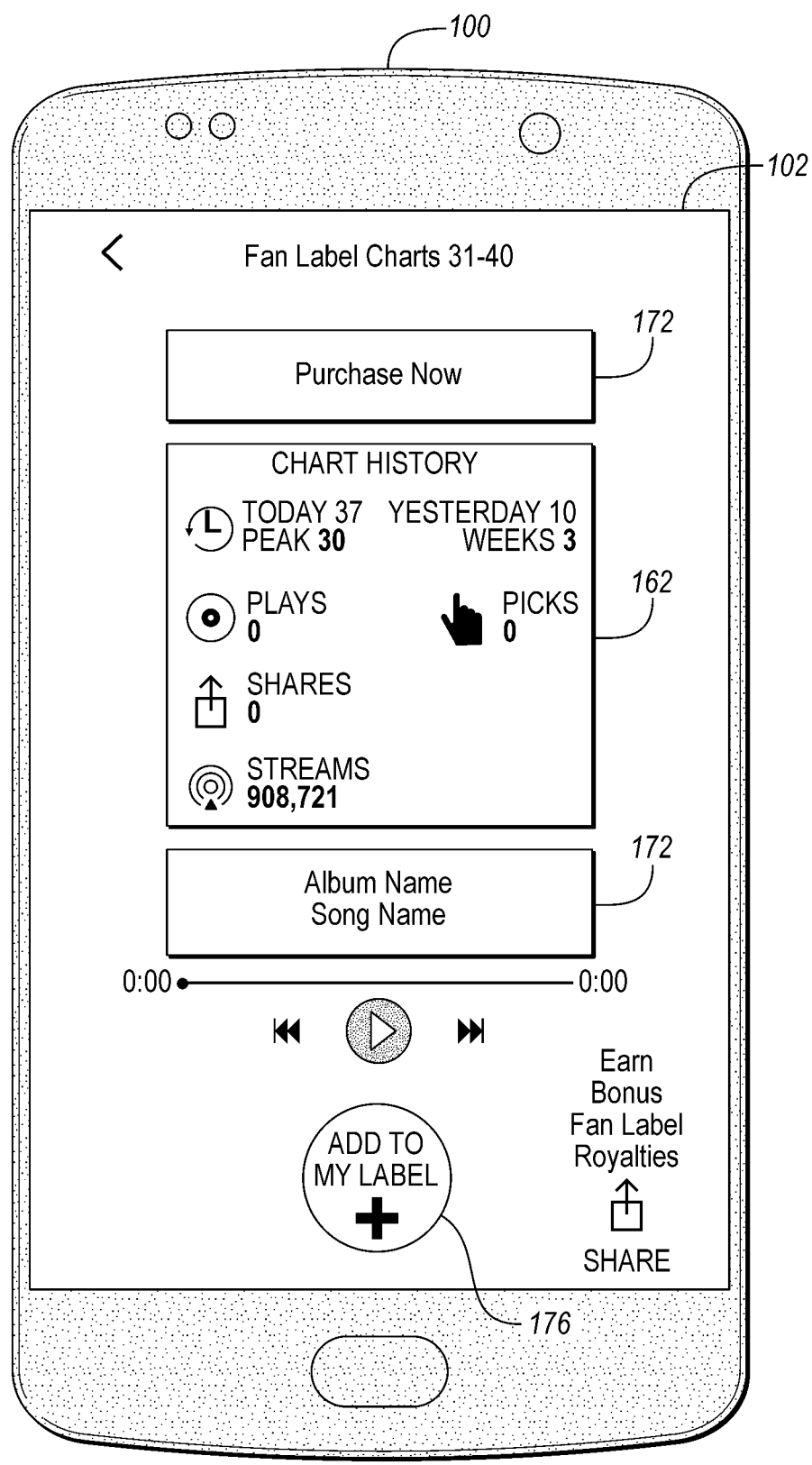
FIG. 6 is a GUI including a selection screen of a digital content item from a digital register.
Figure 7:
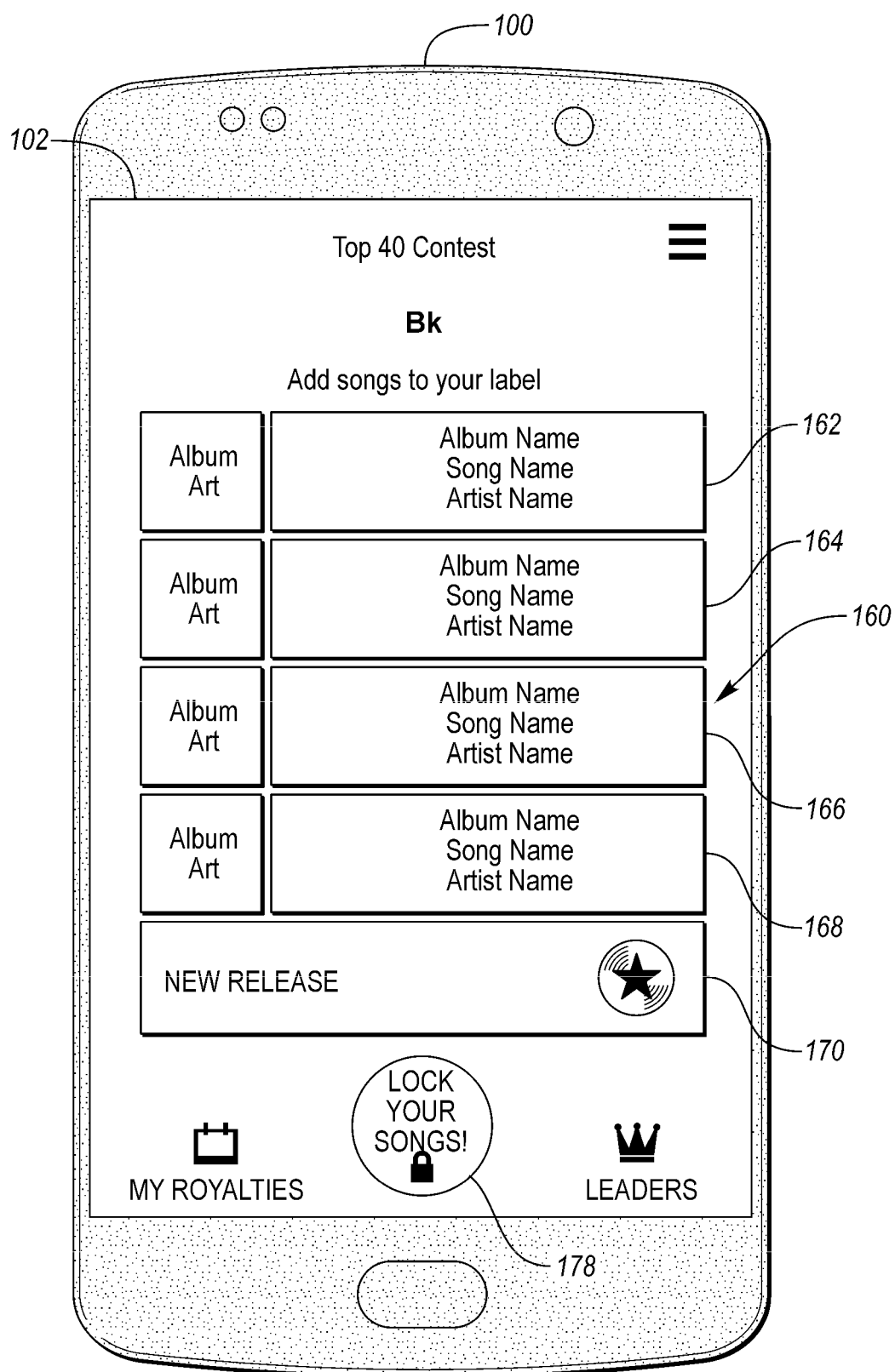
FIG. 7 is a GUI of a digital user ranking for a game.
Figure 8:
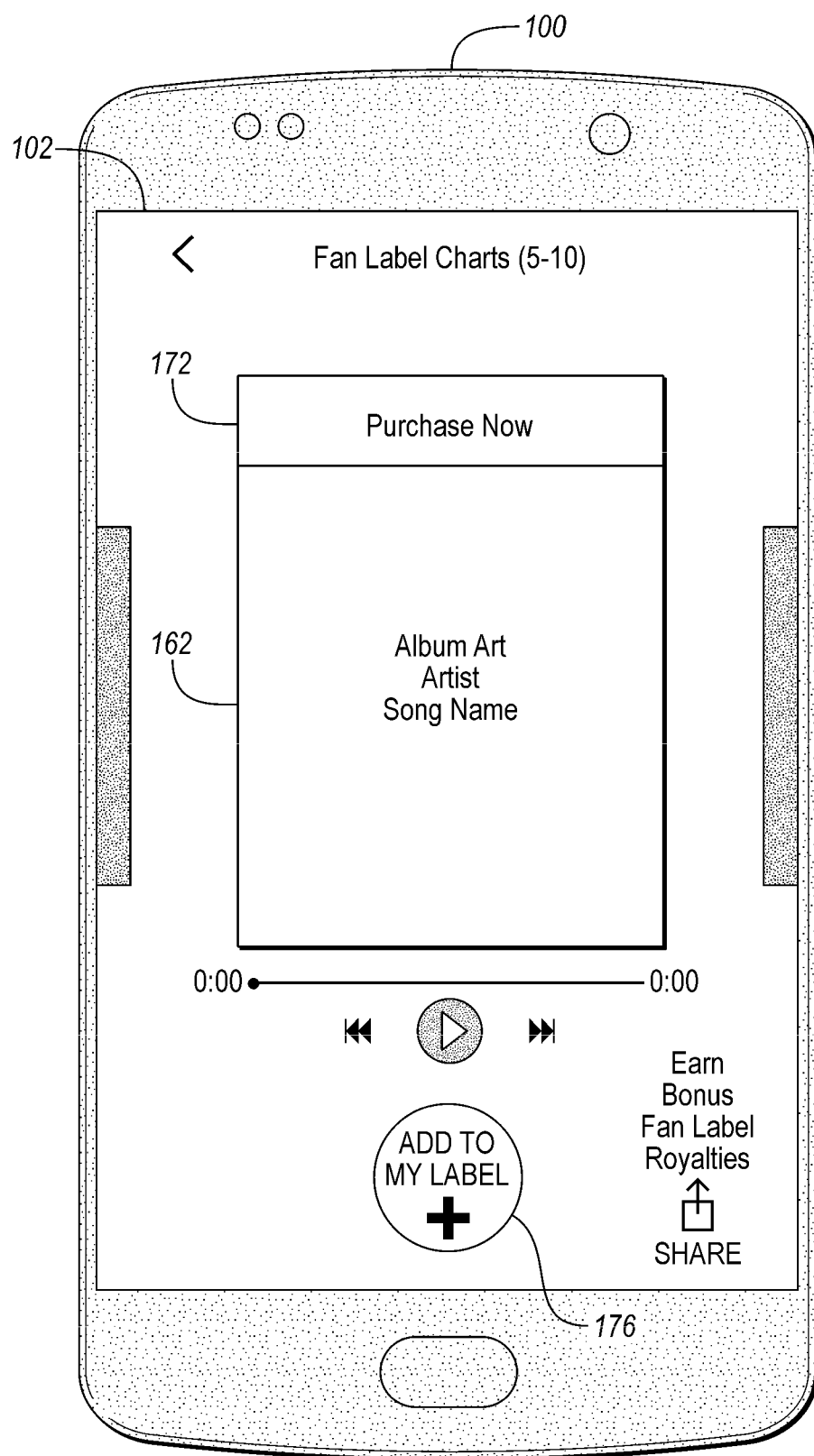
FIG. 8 is a GUI display of an uncharted digital content item of an uncharted digital register.

Referring to FIG. 4, a mobile device 100 having a GUI 102 is shown. The GUI includes a digital content item selection screen 160 of a software application. The digital content selection screen 160 includes a number of selection prompts 162, 164, 166, 168, 170 operable to enable a user to select from a ranked digital content register 210 and an unranked digital content register 220. The score may be viewed by the "my royalties" button. The overall game score may be viewed with the "leaders" button. The user may select the digital content items 212, 222 and proceed to "lock" 178 a selection before the game is started.

Figure 9:
FIG. 9 is a GUI including a selection lock screen and game timer countdown screen.

Referring to FIGS. 5-8, GUIs of the ranked digital register 210 and unranked digital register 220 are shown. The mobile device 100 includes a GUI 102. The GUI 102 includes scrollable prompts 162, 164, 166, 168, 170 for selecting a ranked digital content item 212 and an unranked digital content item 222. Additional information related to the digital content item 212 is selectively shown through button 162. The user is also prompted to purchase a digital content item with button 172. Button 176 allows the user to add the ranked digital content items 212, 222 to the selection. After the digital content items 212, 220 are selected, the user may use button 178 to select in the digital content items 212, 222, which adds the items 212, 222 to the digital user ranking 230. Referring to FIG. 9, a splash screen is shown on the GUI 102 of the mobile device 100. The splash screen indicates the time remaining in the contest 180 and a confirmation button 182.

Figure 10:
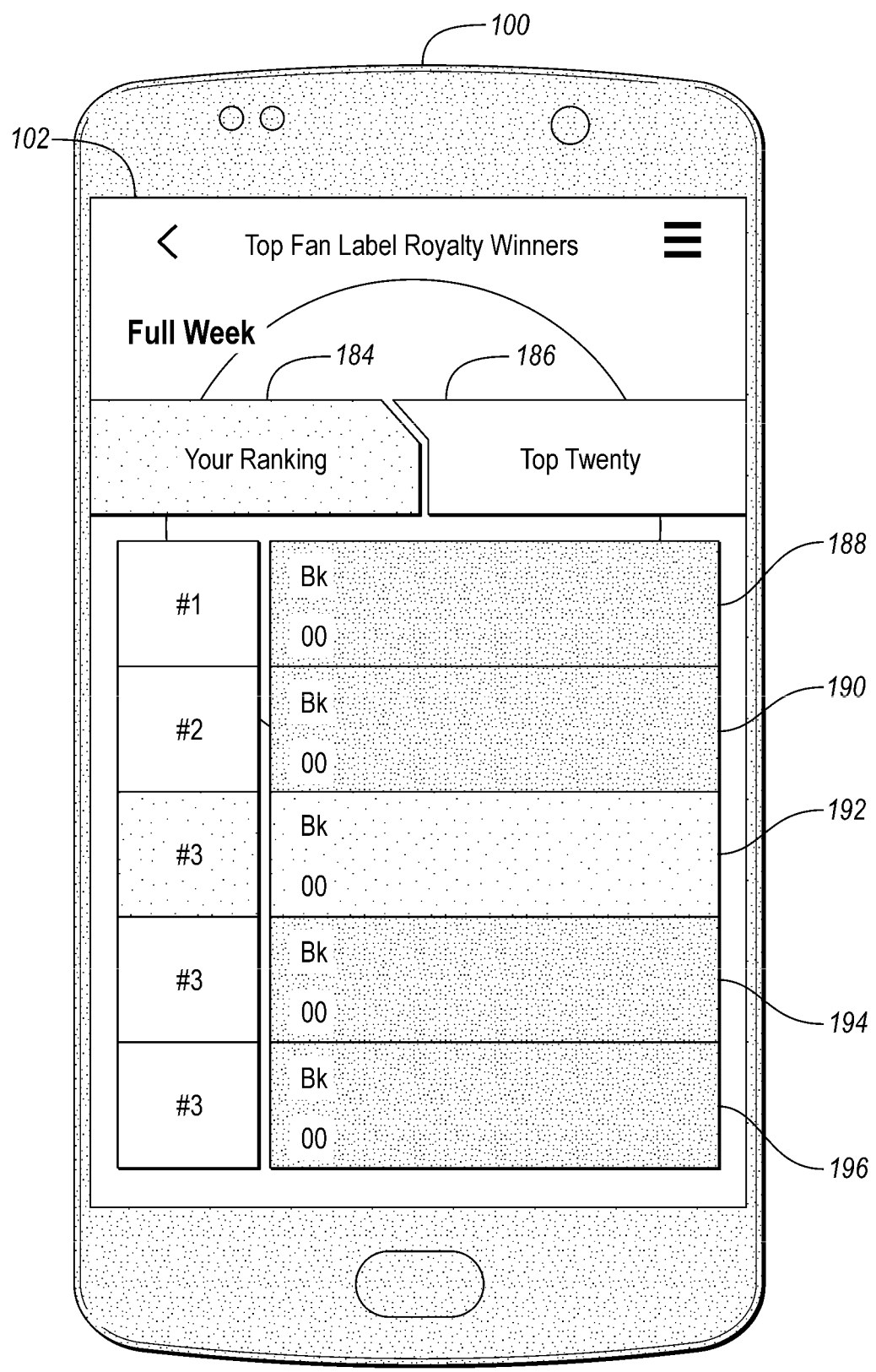
FIG. 10 is a GUI including a scoreboard of a digital user ranking.

Referring to FIG. 10 a list of points 188, 190, 192, 194, 196 associated with digital user rankings 230 is shown on the GUI 102 of the mobile device 100. The contest may have numerous digital user rankings 230 from various participants, as shown through each of the point accumulators 188, 190, 192, 194, 196 related to each of the digital user rankings 230. The list is sorted such that the digital user ranking 230 having the highest number of accumulated points 188, 190, 192, 194, 196 is shown. The points are accumulated through activity tracking. The user may select to display a personal ranking 184 or the top twenty digital user rankings 230 through button 186. In some embodiments, the scores 188, 190, 192, 194, 196 may be shown as ticker tape across a top or bottom portion of the GUI 102.

Figure 11:
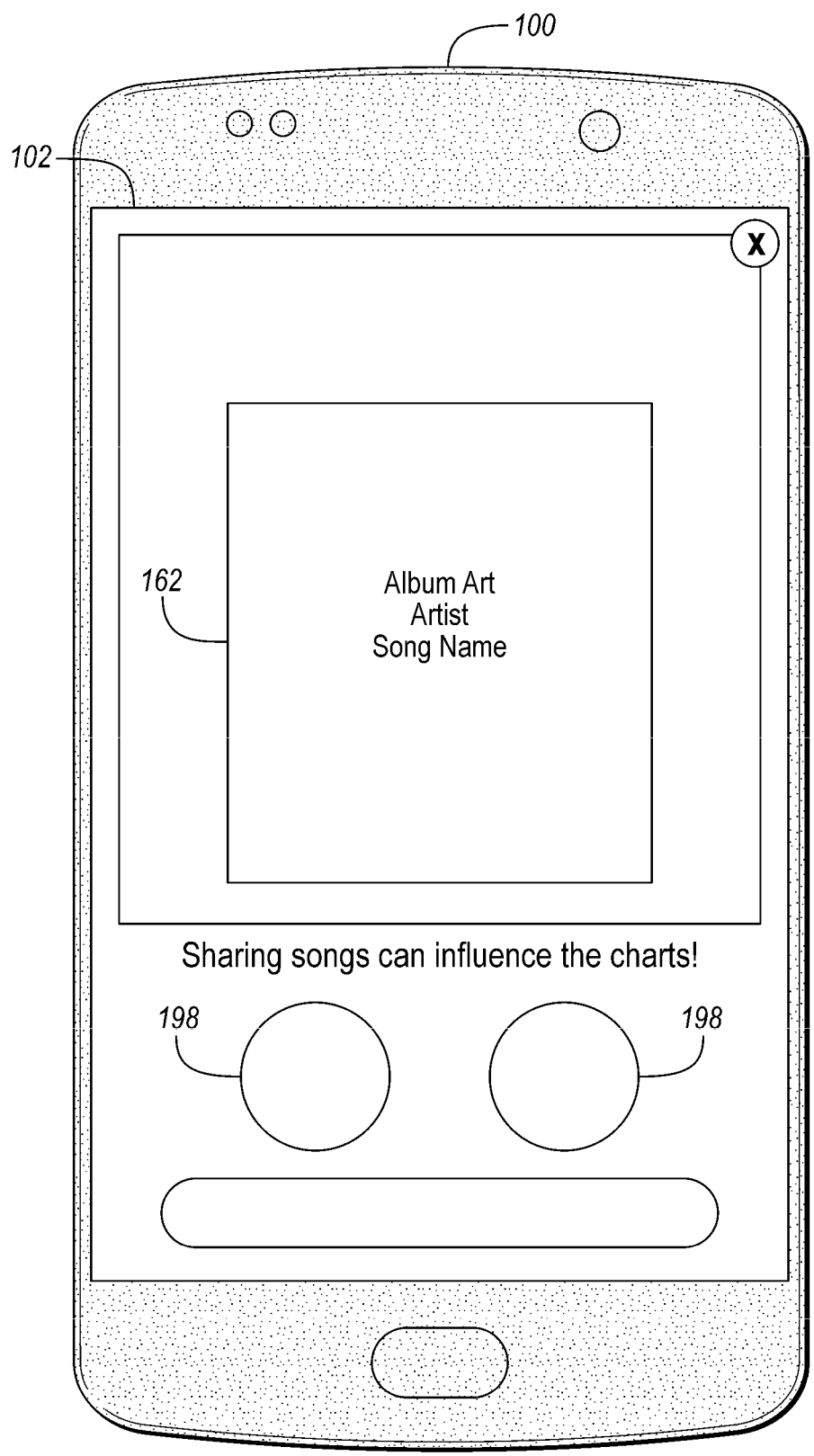
FIG. 11 is a GUI including a promotion screen of a digital content item associated with a digital user ranking.

Referring to FIG. 11, the user may promote or share a selected digital content item 232 associated with the digital user ranking 230 through a similar interface on the GUI 102 of the mobile device 100. A prompt 162 including information associated with the selected digital content item 232. The user is then prompted to promote the selected digital content item 232 through buttons 198 connecting the content to a network. Promotion may be considered an activity tracking parameter that increases a score 188, 190, 192, 194, 196 associated with the user's digital user ranking 230.

Figure 12:
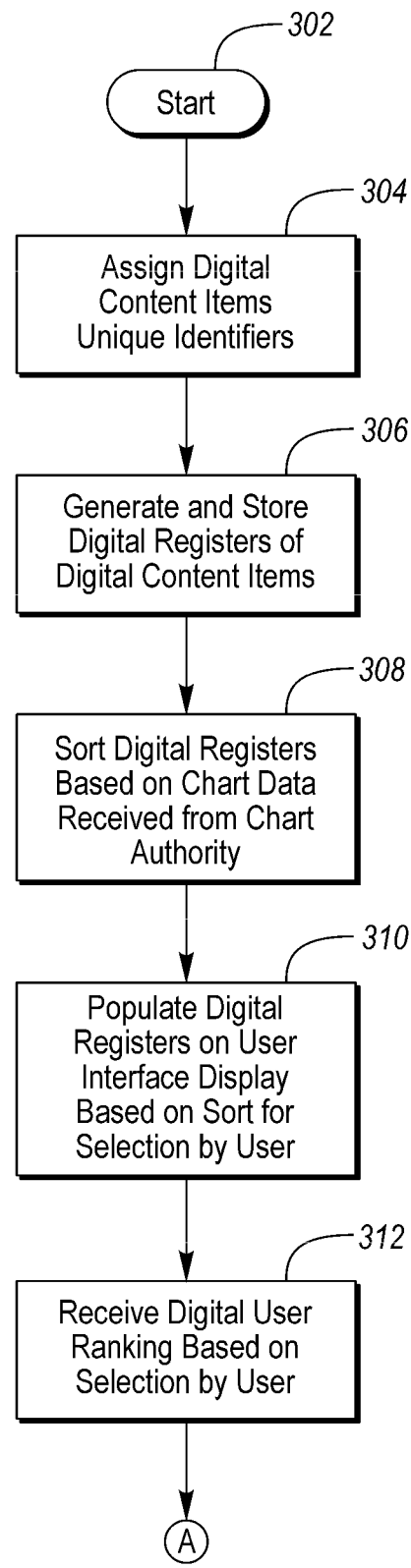
FIG. 12 is a portion of a flow diagram for an improved game scoring computer system.
Figure 13:
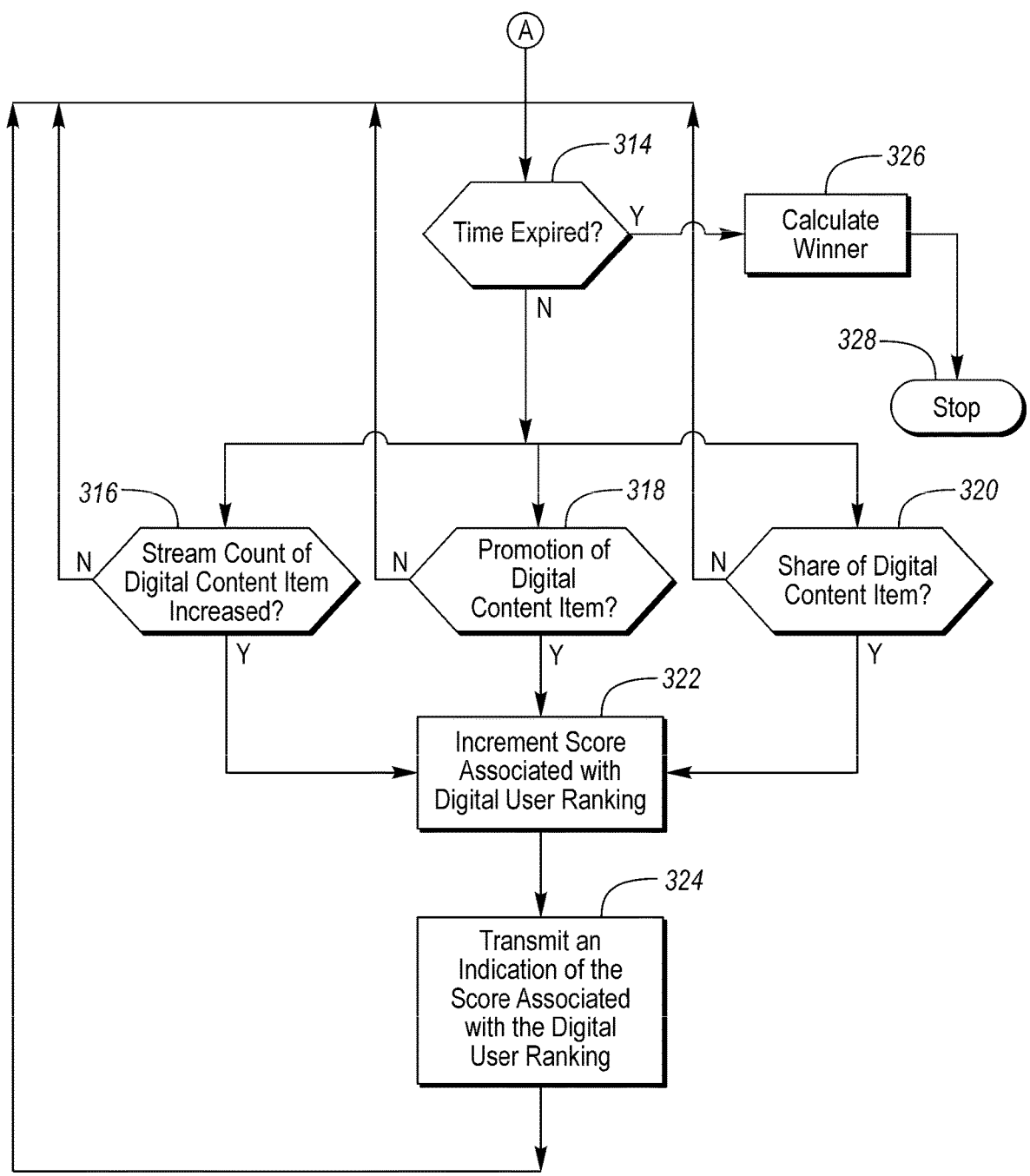
FIG. 13 is a portion of a flow diagram for an improved game scoring computer system.

Referring to FIGS. 12 and 13, a flow diagram 300 of a game is shown. In step 302 the algorithm begins. In step 304, the digital content items 212, 222 are assigned unique identifiers. The unit identifiers may be assigned through a hashing algorithm (e.g., MD5) to uniquely identify each digital content item 212, 222 for selection. The unique identifier may include a portion to signify an original or derivative work.

In step 306, the ranked and unranked digital registers 210, 220 are generated and stored. The ranked digital register 210 is generated based on popularity or other factors. Nielsen® charts and chart positions may be used. The chart position or ranking may indicate a statistical approval rating of the digital content item 232. The chart position or ranking may be defined at a national, state, or local level. Local popularity indexes based on streams in particular regions or associations may be used. For example, the streams belonging to a particular university may be aggregated and assigned to a ranking. The unranked digital register 220 may be generated based on the user or other factors. For instance, the unranked digital register 220 may be created by a local radio station or a college club.

In step 308 the digital registers are sorted and stored by the ranking. The sorting may be performed using various methods. For instance, a merge sort may be used to streamline the sorting process at the mobile device 100. In step 310, the digital registers 210, 220 are populated on the mobile device GUI 102. In step 312, the user selects the digital user ranking 230 by identifying ranked and unranked digital content items 212, 222.

In step 314, the mobile device 100 or backend server 120 determines whether the contest timer has expired. If the timer has not expired an activity tracking algorithm is initiated to determine total points is assigned to each selected digital content item 232 selected in the digital user ranking 230. For example, a score associated with the selected digital content item 232 of the digital user ranking is incremented, in step 322, if the stream count of the selected digital content item 232 has increased, in step 316. Periodic polling of streaming services may be performed to determine the number of streams of the selected digital content item 232. In step 318, if the user has promoted the digital content item 318, the score associated with the digital user ranking is increased in step 322. In step 320, if the user has shared the digital content item, the score associated with the digital user ranking is increased in step 322. For example, the user may use a peer-based sharing service to share the selected digital content item 232 with friends on social media. In step 324, an indication of the score associated with the digital user ranking is transmitted or displayed on the mobile device 100.

The score associated with the digital user ranking may also include a risk factor. The risk factor may proportionately or unproportionately change the points assigned to each score based on a likelihood of success of the digital content item 212, 222 selection. The risk associated with each digital content item 212, 222 may be displayed next to the item 212, 222 during the selection process. The risk may be based on a trend of the digital content items 212, 222 popularity. For example, a song that is losing popularity may be associated with a higher risk, providing greater reward to the user who includes the song in their digital user ranking 230.

If the contest time has expired, in step 314, the backend server 120 or mobile device 100 will calculate a total score of each of the digital user rankings in the contest. The highest score is then submitted as the winner. In step 328 the game is stopped.

Figure 14:
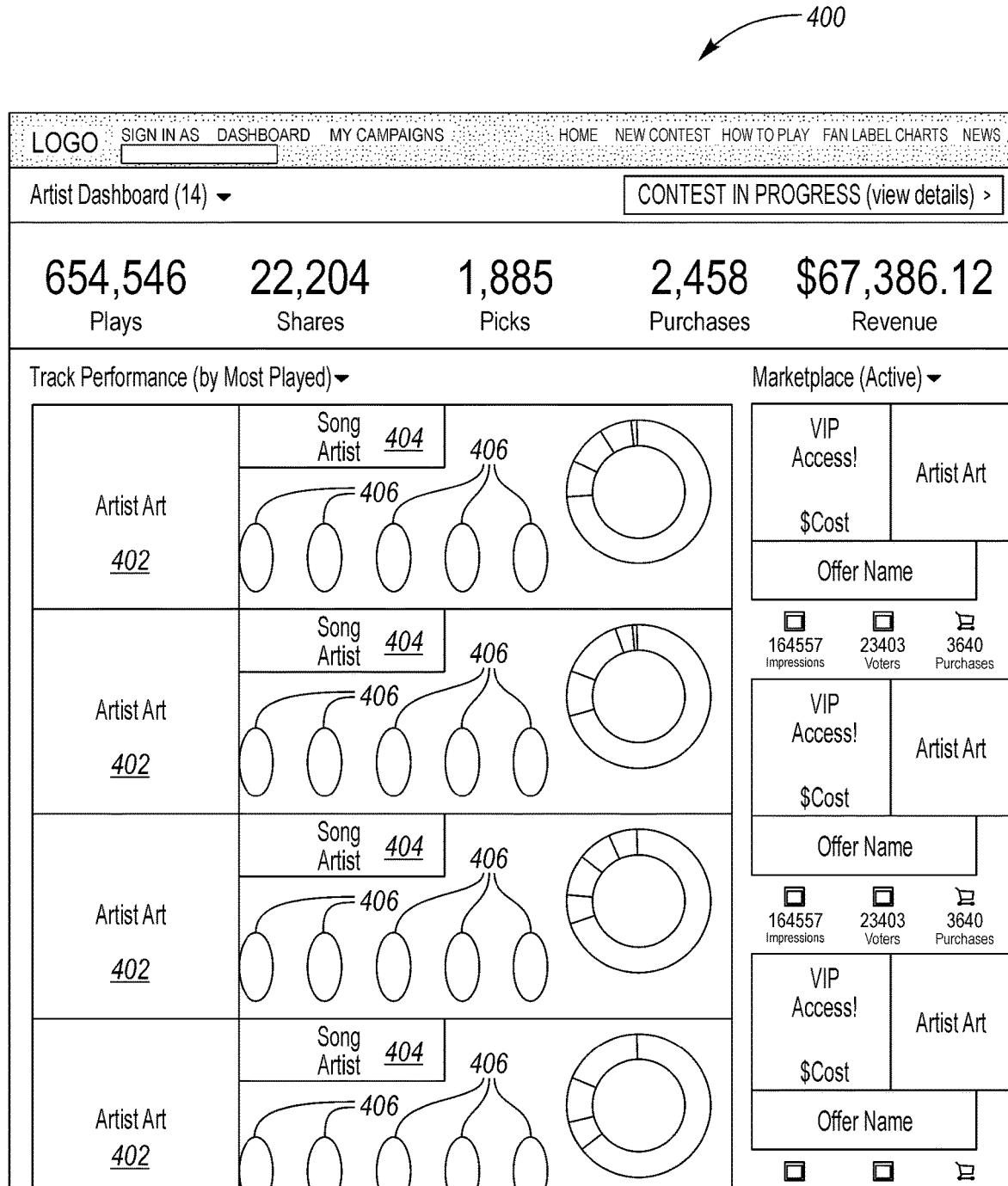
FIG. 14 is a display screen of a GUI including a digital content item creator marketplace.
Figure 15:
FIG. 15 is a display screen of a GUI including a digital content item creator dashboard.

Referring to FIGS. 14 and 15, GUIs 400, 500 for a marketplace of an incentivized electronic platform is shown. The marketplace includes a dashboard that highlights a digital content creator's activity tracking parameters and other information over time. The dashboard may include information related to particular contests, including rewards, promotions, purchases, impressions, views, shares, contests, and other information. The dashboard may include information related to each of a digital content creator's songs. The dashboard may allow a digital content creator to target particular locations, associations, musical genres, or other contest relevant parameters. The digital content creator may award offerings (e.g., backstage passes, digital content items) to any participant that reaches activity tracking parameter points associated with the particular digital content creator above a predetermined threshold. For instance, a music artist may give a backstage pass to any contestant that reaches a score of 750,000 activity tracking points related specifically to that music artist. The contestant may select that artist's songs, promote those songs, share those songs on social media or use other methods to obtain points related to that artist.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A data structure embodied on a computer-readable medium having a database schema for accessing and managing gaming data in a structured query language (SQL) database, the database schema comprising:
   a contest schema including a plurality of contests, each contest including:
      a plurality of user selections, each user selection representing a group of songs and/or artists and corresponding to a player; and
      relational data tables tracking the plurality of songs and/or artists in each user selection to determine a score for each player, the score being based on one or more activity tracking parameters;
   an application accessing and managing the group of selected songs and/or artists, the one or more activity tracking parameters, and scores for each player in the SQL database.

2. An incentivized electronic platform comprising:
   a processor including a computer having a central processing unit (CPU) for executing machine instructions and a memory for storing the machine instructions, the machine instructions when executed perform the following functions:
      a) transmit a splash screen for displaying a contest to a mobile device;
      b) transmit a selection screen for displaying a number of selection prompts corresponding to a digital register, the selection prompts representing songs, albums, and/or artists;
      c) receive a plurality of selections from the selection screen to form a digital music label representing a group of songs, albums, and/or artists; and
      d) transmit a score to the mobile device based on points assigned by an activity tracking algorithm and one or more activity tracking parameters.

3. The incentivized electronic platform of claim 2, wherein the activity tracking algorithm includes a risk factor associated with each song, album, and/or artist.

4. The incentivized electronic platform of claim 2, wherein the activity tracking parameters include at least one of a stream count, popularity, impressions, views, user promotions, shares, and purchases.

5. The incentivized electronic platform of claim 2, wherein the activity tracking parameters include at least two of a stream count, popularity, impressions, views, user promotions, shares, and purchases.

6. The incentivized electronic platform of claim 2, wherein the steps a)-d) are repeated a plurality of times, each time to a different mobile device.

7. The incentivized electronic platform of claim 2, wherein the steps of a)-d) form a contest that is carried out over a period of time between a predefined association of users.

8. A computer system comprising:
   a processor including a computer having a central processing unit (CPU) for executing machine instructions and a memory for storing the machine instructions, the machine instructions when executed implement the following functions:
      transmitting a digital register of albums, songs, and/or artists to a plurality of user transceivers;
      receiving a collection of albums, songs and/or artists from each of the plurality of user transceivers, the collection of albums, songs, and/or artists being selected from the digital register of albums, songs, and/or artists;
      calculating a score for each of the collections based on activity tracking data for the plurality of albums, songs and/or artists; and
      transmitting one or more of the scores to each of the plurality of user transceivers.

9. The computer system of claim 8, wherein the activity tracking data includes stream counts, and shares.

10. The computer system of claim 9, wherein the activity tracking data includes views.

11. The computer system of claim 10, wherein the activity tracking data includes impressions.

12. The computer system of claim 11, wherein the activity tracking data includes purchases.

13. The computer system of claim 12, wherein the activity tracking data includes promotions.

14. The computer system of claim 13, wherein the activity tracking data includes popularity.

15. An incentivized electronic platform comprising:
   a processor including a computer having a central processing unit (CPU) for executing machine instructions and a memory for storing the machine instructions, the machine instructions when executed implement the following functions:
      a) generate a contest having a contest timer with start time and an expiration;
      b) generate one or more digital registers of albums, songs, and/or artists for the contest;
      c) transmit the one or more digital registers to a plurality of user transceivers;
      d) receive a plurality of digital record labels, each digital record label corresponding to a respective one of the plurality of user transceivers and representing a group of albums, songs and/or artists selected from the one or more digital registers on the respective one of the plurality of user transceivers;
      e) initiate an activity tracking algorithm to assign points to each digital record label; and
      f) display, at a user transceiver, a score based on the points assigned to each digital record label.

16. The incentivized electronic platform of claim 15, wherein steps a) through f) are repeated a plurality of times.

17. The incentivized electronic platform of claim 15, wherein the activity tracking algorithm assigns points based on stream counts, promotions, shares, views, purchases, and/or a risk factor of the albums, songs, and/or artists in the plurality of digital record labels.

18. The incentivized electronic platform of claim 15, wherein the score is calculated in real-time.

19. The incentivized electronic platform of claim 15, wherein the activity tracking algorithm is initiated at the start time.

20. The incentivized electronic platform of claim 19, wherein the points are assigned until the expiration.

21. The incentivized electronic platform of claim 15, wherein the score is incremented if the stream counts, promotions, shares, views, or purchases have increased over the period of time.

22. The incentivized electronic platform of claim 15, wherein the contest is limited to a predefined association of a user associated with each of the plurality of user transceivers.

23. The incentivized electronic platform of claim 22, wherein the predefined association is a predominant location of each user aggregated over a location assessment period.

* * * * *